3,057,723
HARDENING OF GELATIN WITH OXYSTARCH
Roy A. Jeffreys and Bryan E. Tabor, Harrow, England, assignors to Eastman Kodak Company, Rochester, N.Y., a corporation of New Jersey
No Drawing. Filed June 24, 1959, Ser. No. 822,444
5 Claims. (Cl. 96—99)

This invention relates to the hardening of gelatin by incorporating in a coating composition comprising gelatin, oxystarch obtained by an oxidation method which yields predominantly aldehyde groups and less than 12 percent of carboxyl groups. For example in discussing the oxidation of starch with periodic acid the fourth edition of "Thorpe's Dictionary of Applied Chemistry," volume XI, pages 70–71, teaches "Special significance attaches to the action of periodic acid which, under controlled conditions, oxidizes α-glycol group only. Thus the glucose units (excepting the end units) of starch become oxidized at the $C_2$ and $C_3$ positions, the pyranose ring is broken and two aldehyde groups are formed." Similarly water soluble periodate salts may also be used.

Hardeners which have been commonly used for hardening gelatin, such as formaldehyde or chromic acid, have characteristics which are often times not desirable. For instance, formaldehyde may have a derogatory effect upon photographic emulsions. Some hardeners which have been suggested heretofore as hardeners in gelatin coating compositions have been characterized by wandering from one layer to another. Not only have gelatin hardeners previously suggested by the prior art been guilty of causing deterioration of photographic emulsions, but also hardeners have been suggested which have necessitated heating of the gelatin layer to obtain the desired hardening effect.

One object of our invention is to provide a hardening agent for gelatin which is not characterized by diffusion from one layer to another even though the hardened gelatin layer is adjacent to a non-hardened gelatin layer. Another object of our invention is to provide a hardener for gelatin which has no derogatory effect on photographic emulsions when used therein. A further object of our invention is to provide a gelatin hardener which is effective without requiring the application of an elevated temperature. A further object of our invention is to provide a hardener for gelatin which is prepared from common, inexpensive, readily-available material. Other objects of our invention will appear herein.

We have found that starch which has been subjected to oxidation, e.g. periodate oxidation, wherein a part of the secondary alcohol groups in the starch are converted to the aldehyde groups exhibit excellent hardening properties when incorporated in gelatin coating compositions. We have found that oxystarch (aldehydo-starch) has a hardening effect upon gelatin even when employed in small proportions. However, it is usually desirable to employ at least 0.5% of oxystarch, based on the weight of the gelatin, a convenient range of proportions for use of this hardener being 0.5–5% of the gelatin.

Oxystarch such as is useful in our invention can be prepared by oxidation with a water-soluble periodate or periodic acid. One method which has been disclosed for preparing oxystarch is that of Grangaard, Mitchell, and Purves, J. Amer. Chem. Soc., 1939, 61, 1290. By that procedure the starch is pre-swollen in boiling water and then oxidized with sodium metaperiodate. As a result of that action secondary alcohol groups in the starch are oxidized to aldehyde groups. It is not necessary that all of the secondary alcohol groups of the starch be oxidized to aldehyde groups to get an oxystarch having hardening action on gelatin. It is desirable, however, that at least 30% of the secondary alcohol groups of the starch be oxidized. The oxystarch is ordinarily more powerful as a gelatin hardener as the percentage conversion of secondary alcohol groups to aldehyde increases. Therefore, it is desirable that the oxystarch hardener be used in greater proportion with degrees of oxidation in the lower part of the range. The most powerful hardeners are those which result from oxidation of 80–100% of the secondary alcohol groups of the starch to aldehyde groups. Instead of pre-swelling the starch in boiling water in preparing the oxidized starch the oxidation can be carried out on a suspension of the starch in water, using either a water-soluble salt of periodic acid or the free acid. The product thus obtained may be dried under vacuum. It is stable to storage, that is, it may be kept for long periods such as at least a year without losing its effectiveness as a gelatin hardener. The oxystarch is soluble in water in amounts up to about 2% or if the starch was swelled in boiling water before oxidizing aqueous solutions of as much as 3% concentration or more may be prepared therefrom.

The compounds of the invention may be incorporated in aqueous gelatin compositions or they may be incorporated in gelatin compositions in which inorganic materials are also present such as silver halide photographic emulsions, silver halide photographic emulsions containing incorporated color-forming couplers, barium sulfate suspensions in aqueous gelatin or suspensions of titanium dioxide in which gelatin is the protective colloid. The hardening agents in accordance with our invention are especially useful in photographic emulsions.

As an example of the usefulness of oxystarch hardeners they were incorporated in fine grain silver iodobromide photographic emulsions containing 6–7% of gelatin. The emulsions thus prepared were coated onto glass plates and the speeds were determined in arbitrary units being the step corresponding to a density of 0.2 above fog on an exposure wedge in which the exposure increases by 0.1 log unit per step. In every example tested the fog level of the hardened emulsions was no higher than that of the untreated emulsions.

Emulsion compositions hardened in accordance with our invention were subjected to both ordinary keeping tests and to incubation tests. In the ordinary keeping tests the material tested was stored under enclosed conditions for the time stated. By these tests the keeping properties of the emulsions were determined. Incubation tests were made to determine the maximum possible hardening obtainable with the oxystarch in a limited period. The photographic properties of the emulsion layers were not determined in these tests.

Since the most useful hardening is not obtained immediately on coating but only after drying and keeping a few days, the first measurement for the ordinary keeping tests was made 7 days after coating and drying.

The following examples illustrate the results obtained by hardening gelatine photographic emulsion layers with oxidized starch.

EXAMPLE 1

Oxystarch was prepared by oxidizing maize starch (20.25 grams) in water (500 ccs.) with periodic acid (54 grams of a 50% aqueous solution) for 8 hours. The resulting product was added in different proportions to a silver iodobromide photographic emulsion as referred to heretofore and the resulting products were subjected to both keeping and incubation tests and the speeds and melting points were determined. The melting point of a gelatin coating is determined by immersing the coating in water whereupon the temperature is continuously increased. The temperature at which the gelatin coating dissolves off from the support upon which it is coated is listed as the melting point. The following table gives the results obtained from the coatings containing no hardener and those containing hardener as described herein.

*Keeping Tests*

|  | After 7 days | | After 3 months | | After 6 months | |
|---|---|---|---|---|---|---|
|  | Speed | M.P. (° F.) | Speed | M.P. (° F.) | Speed | M.P. (° F.) |
| Untreated emulsion | 22.0 | 90 | 19 | 89 | 19 | 90 |
| Emulsion containing oxystarch I (0.3 g./l.) | 22.0 | 90 | 20 | 92 | 19.5 | 92 |
| Emulsion containing oxystarch I (1.0 g./l.) | 22.0 | 117 | 19 | 143 | 18.5 | 169 |

*Incubation Tests*

|  | 3 days at 95% R.H. and 120° F. (M.P., ° F.) | 7 days at 42% R.H. and 120° F. (M.P., ° F.) |
|---|---|---|
| Untreated emulsion | 105 | 91 |
| Emulsion containing oxystarch I (0.3 g./l.) | 201 | 107 |
| Emulsion containing oxystarch I (1.0 g./l.) | Over 200 | Over 200 |

EXAMPLE 2

Oxystarch was prepared from maize starch as described in the preceding example, but in one case ½ of the original periodic acid was used, the resulting product being designated oxystarch II. In another case, ¼ of the original amount of periodic acid was used and the product obtained was designated as oxystarch III. The oxystarch was incorporated in photographic emulsion compositions. Compositions were tested as designated and the results obtained were as follows:

*Keeping Test*

|  | After 7 days | | After 3 months | |
|---|---|---|---|---|
|  | Speed | M.P. (° F.) | Speed | M.P. (° F.) |
| Untreated emulsion | 22 | 90 | 20 | 90 |
| Emulsion containing oxystarch I (1.0 g./l.).[1] |  |  |  |  |
| Emulsion containing oxystarch I (0.3 g./l.) | 20.5 | 101 | 20.5 | 108 |
| Emulsion containing oxystarch II (1.0 g./l.) | 21.5 | 130 | 20 | 166 |
| Emulsion containing oxystarch II (0.3 g./l.) | 22 | 91 | 20 | 94 |
| Emulsion containing oxystarch III (1.0 g./l.) | 22 | 95 | 20 | 95 |
| Emulsion containing oxystarch III (0.3 g./l.) | 22 | 91 | 21 | 92 |

[1] Hardening was too rapid to allow coating of this emulsion.

To illustrate the non-wandering nature of the hardening agents in accordance with our invention a gelatin layer containing 0.03 gram of oxystarch per gram of gelatin was coated out onto a wet unhardened plain gelatin layer and the layers were dried in a current of warm dry air and were then kept at 74% R.H. for 4 weeks. The melting points of the hardened and unhardened layers were found to be 158° F. and 86° F. respectively. The fact that the melting point of the unhardened layer had remained substantially unchanged was an indication that no diffusion of the hardener from the hardened gelatin layer to the non-hardened layer had occurred. The oxystarch which had been employed in this test was of the same type as that used in Example 1.

The diffusion test described was repeated except that the unhardened gelatin layer was allowed to dry before a coating of the gelatin layer containing oxystarch was applied thereover. After the layers were dried and kept at 74% R.H. for 4 weeks the melting point of the unhardened layer was found to be substantially unchanged.

In the making of aldehydo-starch by the periodate method, carrying out of the oxidation of the starch while in suspension in water is preferred because the product is obtained in a form which is convenient for filtration and purification by washing. The oxidized starch thus prepared offers some resistance to dissolving in boiling water particularly if a concentration of greater than 2% is desired. We have found that this oxidized starch, if oxidized by treatment with sodium chlorite by the method described by Hofreiter, Wolff and Mehltretter (J.A.C.S. 1957, 79, 6457), gives a product which is more readily water-soluble and which is effective for hardening gelatin coatings as illustrated by the following example:

EXAMPLE 3

10 grams of aldehydo-starch was mixed with a solution of 1 mole of sodium chlorite in 0.5 mole of acetic acid (63 cc.) and the mass was stirred overnight. Two volumes of ethanol were then added. A gum formed, which was dispersed in 70 cc. of water and was precipitated in ethanol. The product was again dispersed in water and precipitated with ethanol. The resulting product which was a carboxy oxystarch was dried under vacuum. 4.4 grams of a white powder was obtained.

This material was dissolved in water and was added to a fine grained gelatino silver bromoiodide photographic emulsion in varying amounts and coatings were made thereof. After standing for 7 days the emulsion layer was tested for speed and melting and the following results were obtained:

|  | Speed | M.P. (° F.) |
|---|---|---|
| Emulsion without hardener | 22 | 89 |
| Emulsion containing carboxy oxystarch (0.3 g./l.) | 21.5 | 95 |
| Emulsion containing carboxy oxystarch (1.0 g./l.) | 21.5 | 144 |
| Emulsion containing carboxy oxystarch (3.0 g./l.) | 20 | >200 |

The oxystarches useful as gelatin hardeners in accordance with our invention are the oxidation products of processes whereby a carbon-to-carbon bond is cleaved and two aldehyde groups are formed from secondary alcohol groups of anhydroglucose units of the starch as illustrated by the following:

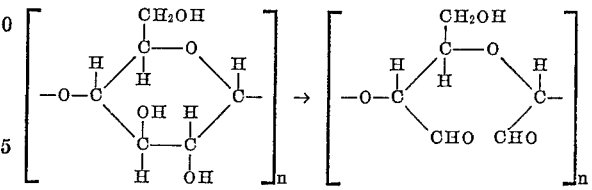

The resulting product is known as oxystarch or dialdehyde starch. It is preferably prepared by the methods described in U.S. Patents Nos. 2,648,629 and 2,713,553 wherein sodium periodate is regenerated electrolytically during the oxidation procedure.

EXAMPLE 4

The following results are for tests performed in a high speed bromoiodide emulsion optically sensitized with a cyanine dye. The films were exposed in an Eastman Type IB sensitometer and processed in Kodak developer DK-50 for five minutes, fixed, washed and dried. The relative speed numbers used in the table are inversely proportional to the exposure required to produce a density of .3 above fog. The melting point data were obtained with unprocessed coatings after incubation for one day at 100° F. The value 212°–2 min. indicates that no melting was observed when the strips were subjected to this temperature for two minutes, which is the upper limit of the test.

| Feature | Percent on weight of gel | Relative speed | γ | Fog | Reticulation °F. | Melting point °F. |
|---|---|---|---|---|---|---|
| Control | | 100 | 1.53 | .12 | 82 | 86 |
| Oxystarch 86% oxidized | 1.5 | 78 | 1.10 | .11 | 129 | 139 |
| As above | 3.0 | 83 | 1.07 | .11 | None | 209 |
| Control | | 100 | 1.25 | .15 | 84 | 86 |
| Oxy-soluble starch 88% oxidized | 2.4 | 95 | 1.15 | .11 | 120 | 128 |
| As above | 6.1 | 81 | 1.03 | .12 | None | 200 |
| Control | | 100 | 1.27 | .13 | 79 | 87 |
| Oxy-soluble starch 80% oxidized | 1.8 | 83 | 1.13 | .10 | 109 | 153 |
| As above | 2.7 | 80 | 1.08 | .10 | None | [1] 212 |

[1] 2 minutes.

The utility of the compounds of this invention when used in gelatino-silver halide photographic emulsions containing color-forming couplers can be illustrated by the following example.

EXAMPLE 5

The following data are for tests performed in a high-speed bromoiodide emulsion which was optically sensitized to the region between 5000 and 6000 A. and, in addition, contained a magenta dye forming coupler suitably dispersed in a high boiling organic solvent.

The film coatings were exposed on an Eastman Type IB sensitometer for 1/50 second to the light emitted by a 500 w. tungsten lamp adjusted to 6100° K. and further modulated by a Wratten #15 filter. The exposed strips were processed in the Kodak E-2 Ektachrome process.

Melting points were taken on unprocessed coatings in a two percent sodium carbonate solution.

| Feature | Oxidation level, percent | Concentration (Percent of gelatin) | $D_{max}$ | Relative speed | Melting point, °F. |
|---|---|---|---|---|---|
| Control | | | 2.75 | 100 | 104 |
| Oxystarch | 80 | 2 | 3.05 | 100 | 158 |
| As above | 80 | 4 | 3.07 | 100 | >185 |
| Oxystarch from soluble starch | 80 | 2 | 3.19 | 100 | 158 |
| As above | 80 | 4 | 3.05 | 100 | >185 |
| Oxystarch from soluble starch | 80 | 2 | 2.97 | 100 | 158 |
| As above | 80 | 4 | 3.35 | 100 | >185 |
| Oxystarch OC-11 | 98 | 2 | 3.01 | 100 | 140 |
| As above | 98 | 4 | 2.95 | 83 | >185 |
| Oxystarch 52/53 | 73 | 2 | 3.03 | 87 | 140 |
| As above | 73 | 4 | 3.03 | 87 | >185 |
| Oxystarch | 73 | 2 | 3.11 | 91 | 140 |
| As above | 73 | 4 | 3.11 | 76 | >185 |

It should be noted that the lower relative speed values of the coatings containing the hardeners of this invention are probably due to the impermeability of the emulsion to the developer caused by the efficient hardening of emulsion.

The photographic emulsions used in practicing our invention are of the developing-out type.

The emulsions can be chemically sensitized by any of the accepted procedures. The emulsions can be digested with naturally active gelatin, or sulfur compounds can be added such as those described in Sheppard U.S. Patent 1,574,944, issued March 2, 1926, Sheppard et al. U.S. Patent 1,623,499, issued April 5, 1927, and Sheppard et al. U.S. Patent 2,410,689, issued November 5, 1946.

The emulsions can also be treated with salts of the noble metals such as ruthenium, rhodium, palladium, iridium, and platinum. Representative compounds are ammonium chloropalladate, potassium chloroplatinate, and sodium chloropalladite, which are used for sensitizing in amounts below that which produces any substantial fog inhibition, as described in Smith and Trivelli U.S. Patent 2,448,060, issued August 31, 1948, and as antifoggants in higher amounts, as described in Trivelli and Smith U.S. Patents 2,566,245, issued August 28, 1951, and 2,566,263, issued August 28, 1951.

The emulsions can also be chemically sensitized with gold salts as described in Waller et al. U.S. Patent 2,399,083, issued April 23, 1946, or stabilized with gold salts as described in Damschroder U.S. Patent 2,597,856, issued May 27, 1952, and Yutzy and Leermakers U.S. Patent 2,597,915, issued May 27, 1952. Suitable compounds are potassium chloroaurite, potassium aurithiocyanate, potassium chloroaurate, auric trichloride and 2-aurosulfobenzothiazole methochloride.

The emulsions can also be chemically sensitized with reducing agents such as stannous salts (Carroll U.S. Patent 2,487,850, issued November 15, 1949), polyamines, such as diethyl triamine (Lowe and Jones U.S. Patent 2,518,698, issued August 15, 1950), polyamines, such as spermine (Lowe and Allen U.S. Patent 2,521,925, issued September 12, 1950), or bis(β-aminoethyl) sulfide and its water-soluble salts (Lowe and Jones U.S. Patent 2,521,926, issued September 12, 1950).

The emulsions can also be optically sensitized with cyanine and merocyanine dyes, such as those described in Brooker U.S. Patents 1,846,301, issued February 23, 1932; 1,846,302, issued February 23, 1932; and 1,942,854, issued January 9, 1934; White U.S. Patent 1,990,507, issued February 12, 1935; Brooker and White U.S. Patents 2,112,140, issued March 22, 1938; 2,165,338, issued July 11, 1939; 2,493,747, issued January 10, 1950, and 2,739,964, issued March 27, 1956; Brooker and Keyes U.S. Patent 2,493,748, issued January 10, 1950; Sprague U.S. Patents 2,503,776, issued April 11, 1950, and 2,519,001, issued August 15, 1950; Heseltine and Brooker U.S. Patent 2,666,761, issued January 19, 1954; Heseltine U.S. Patent 2,734,900, issued February 14, 1956; Van Lare U.S. Patent 2,739,149, issued March 20, 1956; and Kodak Limited British Patent 450,958, accepted July 15, 1936.

The emulsions can also be stabilized with the mercury compounds of Allen, Byers and Murray U.S. Patent 2,728,663, issued December 27, 1955; Carroll and Murray U.S. Patent 2,728,664, issued December 27, 1955; and Leubner and Murray U.S. Patent 2,728,665, issued December 27, 1955; the triazoles of Heimbach and Kelly U.S. Patent 2,444,608, issued July 6, 1948; the azaindenes of Heimbach and Kelly U.S. Patents 2,444,605 and 2,444,606, issued July 6, 1948; Heimbach U.S. Patents 2,444,607, issued July 6, 1948, and 2,450,397, issued September 28, 1948; Heimbach and Clark U.S. Patent 2,444,609, issued July 6, 1948; Allen and Reynolds U.S. Patent 2,713,541, issued July 19, 1955, and 2,743,181, issued April 24, 1956; Carroll and Beach U.S. Patent 2,716,062, issued August 23, 1955; Allen and Beilfuss U.S. Patent 2,735,769, issued February 21, 1956; Reynolds and Sagal U.S. Patent 2,756,147, issued July 24, 1956; Allen and Sagura U.S. Patent 2,772,164, issued November 27, 1956, and those disclosed by Birr in "Z. wiss. Phot.," vol. 47, 1952, pages 2-28; the disulfides of Kodak Belgian Patent 569,317, issued July 31, 1958; the quaternary benzothiazolium compounds of Brooker and Staud U.S. Patent 2,131,038, issued September 27, 1938, or the polymethylene bis-benzothiazolium salts of Allen and Wilson U.S. Patent 2,694,716, issued November 16, 1954; or the zinc and cadmium salts of Jones U.S. Patent 2,839,405, issued June 17, 1958.

The emulsions may also contain speed-increasing compounds of the quaternary ammonium type of Carroll U.S. Patent 2,271,623, issued February 3, 1942; Carroll and Allen U.S. Patent 2,288,226, issued June 30, 1942; and Carroll and Spence U.S. Patent 2,334,864, issued November 23, 1943; and the polyethylene glycol type of Carroll and Beach U.S. Patent 2,708,162, issued May 10, 1955.

The emulsions may contain a suitable gelatin plasticizer such as glycerin; a dihydroxy alkane such as 1,5-pentane diol as described in Milton and Murray U.S. application Serial No. 588,951, filed June 4, 1956; an ester of an ethylene bis-glycolic acid such as ethylene bis(methyl glycolate) as described in Milton U.S. application Serial No. 662,564, filed May 31, 1957; bis-(ethoxy diethylene glycol) succinate as described in Gray U.S. application Serial No. 604,333, filed August 16, 1956, or a polymeric hydrosol as results from the emulsion polymerization of a mixture of an amide of an acid of the acrylic acid series, an acrylic acid ester and a styrene-type compound as described in Tong U.S. Patent 2,852,386, issued September 16, 1958. The plasticizer may be added to the emulsion before or after the addition of a sensitizing dye, if used.

The emulsions may contain a coating aid such as saponin; a lauryl or oleyl monoether of polyethylene glycol as described in Knox and Davis U.S. Patent 2,831,766, issued April 22, 1958; a salt of a sulfated and alkylated polyethylene glycol ether as described in Knox and Davis U.S. Patent 2,719,087, issued September 27, 1955; an acylated alkyl taurine such as the sodium salt of N-oleoyl-N-methyl taurine as described in Knox, Twardokus and Davis U.S. Patent 2,739,891, issued March 27, 1956; the reaction product of a dianhydride of tetracarboxybutane with an alcohol or an aliphatic amine containing from 8 to 18 carbon atoms which is treated with a base, for example, the sodium salt of the monoester of tetracarboxybutane as described in Knox, Stenberg and Wilson U.S. Patent 2,843,487, issued July 15, 1958; a water-soluble maleopimarate or a mixture of a water-soluble maleopimarate and a substituted glutamate salt as described in Knox and Fowler U.S. Patent 2,823,123, issued February 11, 1958; an alkali metal salt of a substituted amino acid such as disodium N-(carbo-p-tert. octylphenoxypentaethoxy)-glutamate as described in Knox and Wilson U.S. patent application Serial No. 600,679, filed July 30, 1956; or a sulfosuccinamate such as tetrasodium N-(1,2-dicarboxyethyl)-N-octadecyl sulfosuccinamate or N-lauryl disodium sulfosuccinamate as described in Knox and Stenberg U.S. patent application Serial No. 691,125, filed October 21, 1957.

The oxidized starch hardeners which we have described may be used in various kinds of photographic emulsions. In addition to being useful in X-ray and other nonoptically sensitized emulsions they may also be used in orthochromatic, panchromatic, and infrared sensitive emulsions. They may be added to the emulsion before or after any sensitizing dyes which are used. Various silver salts may be used as the sensitive salt such as silver bromide, silver iodide, silver chloride, or mixed silver halides such as silver chlorobromide or silver bromoiodide. The agents may be used in emulsions intended for color photography, for example, emulsions containing color-forming couplers or emulsions to be developed by solutions containing couplers or other color-generating materials, emulsions of the mixed-packet type, such as described in Godowsky U.S. Patent 2,698,794, issued January 4, 1955; or emulsions of the mixed-grain type, such as described in Carroll and Hanson U.S. Patent 2,592,243, issued April 8, 1952. These agents can also be used in emulsions which form latent images predominantly on the surface of the silver halide crystal or in emulsions which form latent images predominantly inside the silver halide crystal, such as those described in Davey and Knott U.S. Patent 2,592,250, issued April 8, 1952.

These may also be used in emulsions intended for use in diffusion transfer processes which utilize the undeveloped silver halide in the nonimage areas of the negative to form a positive by dissolving the undeveloped silver halide and precipitating it on a receiving layer in close proximity to the original silver halide emulsion layer. Such processes are described in Rott U.S. Patent 2,352,014, issued June 20, 1944, and Land U.S. Patents 2,584,029, issued January 29, 1952; 2,698,236, issued December 28, 1954, and 2,543,181, issued February 27, 1951; and Yackel et al. U.S. patent application Serial No. 586,705, filed May 23, 1956. They may also be used in color transfer processes which utilize the diffusion transfer of an image-wise distribution of developer, coupler or dye, from a light-sensitive layer to a second layer, while the two layers are in close proximity to one another. Color processes of this type are described in Land U.S. Patents 2,559,643, issued July 10, 1951, and 2,698,798, issued January 4, 1955; Land and Rogers Belgian Patents 554,212, granted July 16, 1957, and 554,935, granted August 12, 1957; Yutzy U.S. Patent 2,756,142, granted July 24, 1956, and Whitmore and Mader U.S. patent application Serial No. 734,141, filed May 9, 1958.

Combinations of these antifoggants, sensitizers, hardeners, etc., may be used.

We claim:
1. A composition of matter comprising gelatin and a hardening amount of the product resulting from the periodate oxidation of starch.
2. A gelatin-silver halide photographic emulsion containing a hardening amount of the product resulting from the periodate oxidation of starch.
3. A gelatin-silver halide photographic emulsion containing a color-forming coupler and a hardening amount of the product resulting from the periodate oxidation of starch.
4. A composition of matter comprising an aqueous solution of gelatin containing as the hardener therein oxystarch prepared by the periodate oxidation of starch and in addition, a dye developer compound, said compound being both a dye and a silver halide developing agent.
5. A photographic element at least one gelatin layer of which contains a small proportion of an oxystarch prepared by the periodate oxidation of starch and in addition a dye developer compound, said compound being both a dye and a silver halide developing agent.

References Cited in the file of this patent

UNITED STATES PATENTS

| | | |
|---|---|---|
| 2,059,817 | Sheppard et al. | Nov. 3, 1936 |
| 2,472,590 | Kenyon et al. | June 7, 1949 |
| 2,648,629 | Dvonch et al. | Aug. 11, 1952 |

OTHER REFERENCES

Chemistry & Industry of Starch, Kerr, 2 ed., Academic Press, Inc., New York, N.Y., page 331.

Chemistry of Org. Compounds, Noller, 2 ed., W. B. Saunders Co., Phil. Pa., page 381, 2nd paragraph.